Figure 1:
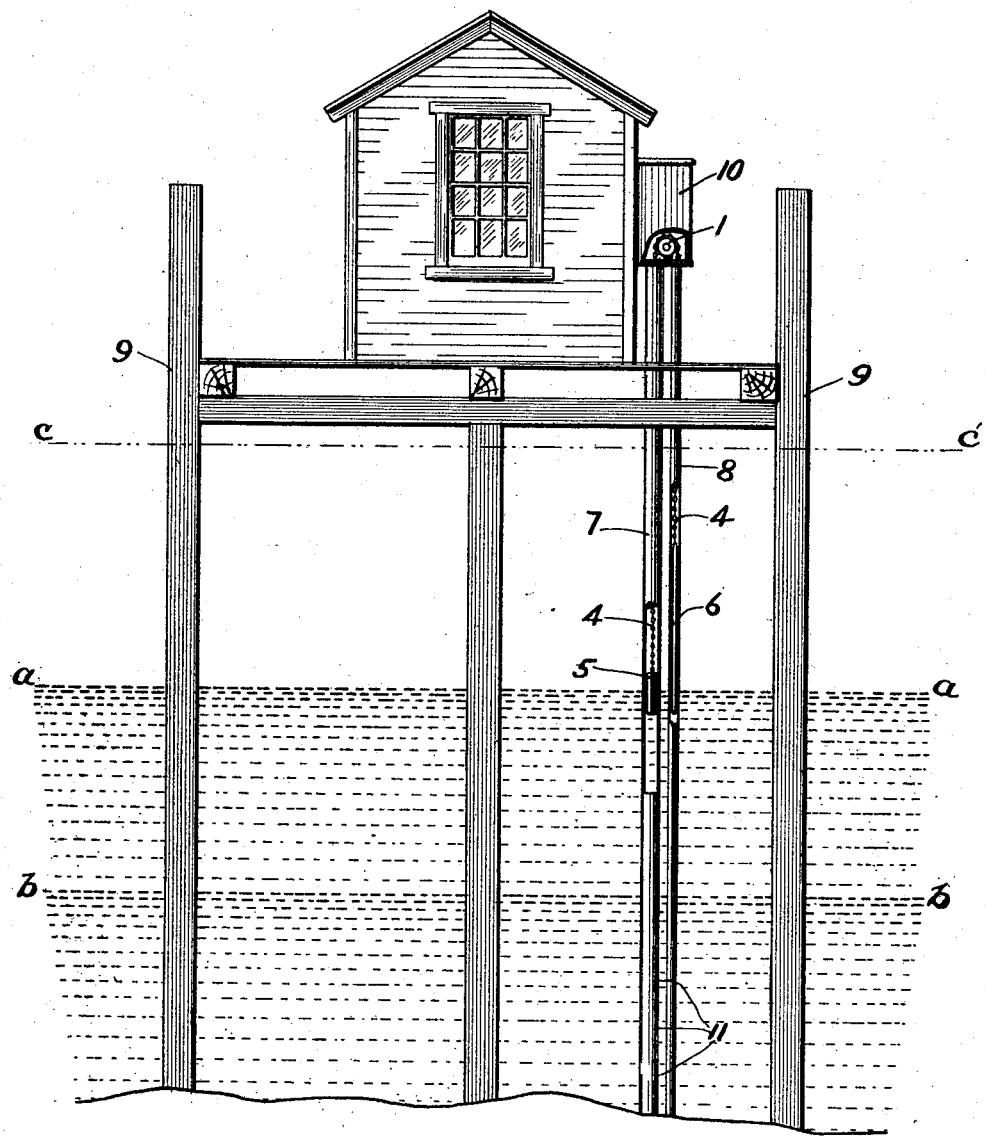

G. E. LAWRENCE.
HYDROGRAPHIC CHRONOGRAPH.
APPLICATION FILED FEB. 26, 1909.

1,054,849.

Patented Mar. 4, 1913.
2 SHEETS—SHEET 1.

WITNESSES:

INVENTOR
George E. Lawrence
BY
Augustus B. Stoughton
ATTORNEY.

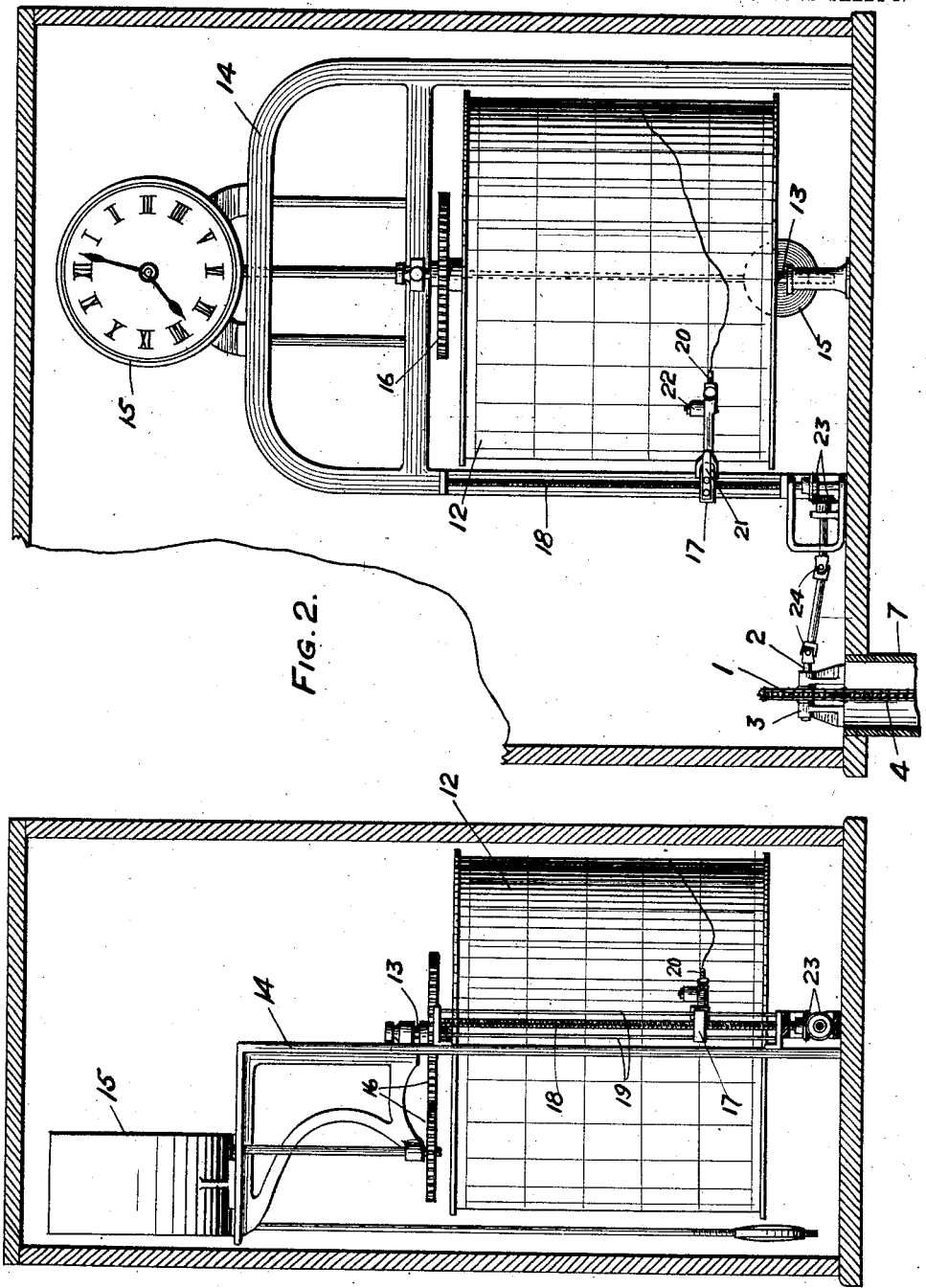

UNITED STATES PATENT OFFICE.

GEORGE E. LAWRENCE, OF PHILADELPHIA, PENNSYLVANIA, ASSIGNOR, BY MESNE ASSIGNMENTS, TO BARRETT & LAWRENCE, INCORPORATED, A CORPORATION OF PENNSYLVANIA.

HYDROGRAPHIC CHRONOGRAPH.

1,054,849.  Specification of Letters Patent.  Patented Mar. 4, 1913.

Application filed February 26, 1909. Serial No. 480,183.

*To all whom it may concern:*

Be it known that I, GEORGE E. LAWRENCE, a citizen of the United States, and a resident of Philadelphia, in the county of Philadelphia and State of Pennsylvania, have invented a new and useful Hydrographic Chronograph, of which the following is a specification.

The principal object of the present invention is to provide a simple, reliable, accurate and comparatively inexpensive instrument for automatically recording the rise and fall of water in rivers, lakes, ponds, streams, oceans and the like during appropriate intervals of time, which may be months or other convenient intervals.

An instrument embodying the invention is capable of varied embodiments and will be claimed at the end hereof, but a description will first be given of the embodiment of the instrument chosen for explanation in connection with the accompanying drawings, in which—

Figure 1, is a view illustrating the instrument arranged for recording the rise and fall of waters in rivers. Fig. 2, is a front view, partly in section drawn to an enlarged scale, and illustrating an instrument embodying features of the invention, and Fig. 3, is a side view partly in section.

In the drawings, 1 is a driving wheel mounted upon a spindle 2, revoluble in suitable bearings 3. The wheel 1 is shown as a sprocket wheel and the bearings are shown as standards. Over the wheel 1 passes a suitable connection, in the present instances, the sprocket chain 4. To one end of this chain 4 is connected a float 5 and to the other end of this chain is connected a counter-weight 6. The float 5 may comprise a hollow metal body or may be otherwise constructed. Tubes 7 and 8 operate as guides for the float and counter-weight respectively and they may be supported in any convenient manner. As shown they are illustrated as supported by the structure of the wharf or pier 9.

The parts 1, 2, and 3, are shown as arranged within a suitable housing or box 10, into which the chain 4 extends. In the example chosen for illustration, the pipes or tubes 7 and 8 extend through the floor of this housing 10. The stream or river is assumed to flow from left to right in Fig. 1 and the down-stream side of the pipe 7, or more accurately, the submerged portion of it, is provided with openings 11. These openings 11 need not extend above for example the mean water level $a$, $a$, and when this is the case there is afforded above the openings 11, a space in the pipe which may be filled with glycerin or other substance that does not freeze easily and which, when present, insures the accurate operation of the float, even though the river may freeze and thaw. As the water level changes, for example between the low level $b$—$b$ and the flood level $c$—$c$, or even beyond those levels, the float and counter-weight in coöperation acting upon the chain, turn the spindle 2 in one direction or the other.

12, is a carrier for recording cards. It is shown to consist of a drum to the periphery of which the cards are applied. The drum is shown as mounted upon a spindle 13, mounted in a frame 14, arranged in the housing.

15, is a clock by means of which the drum is rotated through the intervention of suitable gearing as 16. The clock is arranged to rotate the drum, for example, once in a month and the clock may be made to operate during that time without attention, so that an attendant may visit the plant monthly, take off a card and replace it by a fresh one and then, if necessary, wind the clock. Of course the interval of one month is chosen merely for description.

There is a nut 17 mounted upon a screw 18, revolubly supported by the frame 14. This nut is held against rotation by permitting it to slide on rods 19. The nut carries a stylus arm 20 provided with a stylus which is held up to the paper on the surface of the drum by means of a spring 21.

22, is a receptacle which may be provided for a supply of ink which is delivered to the stylus.

The screw 18 is driven by the spindle 2, as shown through the intervention of bevel gears 23 and links having universal joints 24 interposed between them. The purpose of these joints is to permit the apparatus to work properly even though some of its parts may be somewhat out of line or otherwise disarranged.

The screw, nut, bevel gears and connections constitute means for reducing the motion which is transmitted by the float and counter-weight to the stylus. The movement of the float may be very considerable, as it is well known that the level of some bodies of water is subject to very wide fluctuations, but the movement of the stylus is comparatively small, so that the chart produced while presenting a complete record of the extent of the rise and fall of the body of water and of the time of the occurrence of such rise and fall is comparatively small.

What I claim is:

A hydrographic chronograph comprising the combination of a card carrying drum revoluble about a vertical axis, a clock for turning the drum, a nut carrying a stylus coöperating with the drum, guides for holding the nut against rotation and for permitting it to travel, a screw for causing the nut to travel, a freely revoluble driving sprocket wheel, bevel wheels and links and universal connections interposed between the driving wheel and screw, a connection passing over said sprocket wheel and having at one end a float and at the other end a weight, and guide tubes within which said float any weight are freely movable and of which the float tube is provided in its wall with openings arranged on its down-stream side.

In testimony whereof I have hereunto signed my name.

GEO. E. LAWRENCE.

Witnesses:
　　CLIFFORD K. CASSEL,
　　FRANK E. FRENCH.

---

Copies of this patent may be obtained for five cents each, by addressing the "Commissioner of Patents, Washington, D. C."